United States Patent [19]

Arbiter et al.

[11] 4,331,635

[45] * May 25, 1982

[54] RECOVERY OF COPPER AND/OR NICKEL AND/OR ZINC

[75] Inventors: Nathaniel Arbiter; Martin C. Kuhn, both of Tucson, Ariz.

[73] Assignee: Atlantic Richfield Company, Los Angeles, Calif.

[*] Notice: The portion of the term of this patent subsequent to May 4, 1995, has been disclaimed.

[21] Appl. No.: 896,212

[22] Filed: Apr. 13, 1978

Related U.S. Application Data

[63] Continuation-in-part of Ser. No. 656,840, Feb. 10, 1976, abandoned, which is a continuation of Ser. No. 457,269, Apr. 2, 1974, abandoned, which is a continuation-in-part of Ser. No. 232,454, Mar. 7, 1972, abandoned, and a continuation-in-part of Ser. No. 265,709, Jun. 23, 1972, abandoned, and a continuation-in-part of Ser. No. 301,475, Oct. 27, 1972, abandoned, which is a continuation-in-part of Ser. No. 232,454, , abandoned, said Ser. No. 335,770, is a continuation-in-part of Ser. No. 242,340, Apr. 10, 1972, abandoned, and Ser. No. 438,649, Feb. 1, 1974, abandoned, which is a continuation-in-part of Ser. No. 232,454, , abandoned.

[51] Int. Cl.$^3$ .................. C22B 15/10; C22B 19/24; C01G 33/12; C01G 39/00
[52] U.S. Cl. .................................... 423/33; 423/109; 423/150; 75/103
[58] Field of Search ............... 423/32, 33, 109, 150; 75/103, 117, 119, 120

[56] References Cited

U.S. PATENT DOCUMENTS

2,822,263  2/1958  Forward ........................... 423/32
3,954,450  5/1976  Kuhn et al. ........................ 75/103

FOREIGN PATENT DOCUMENTS

2311285  9/1973  Fed. Rep. of Germany ........ 423/32

OTHER PUBLICATIONS

Kirk–Othmer, *Encyclopedia of Chemical Technology*, 2nd Edition, John Wiley, NY (1967), vol. 13, pp. 582–589.

Transactions of AIME–Journal of Metals–Mar. 1955–pp. 457–463.

Forward et al., "Chemistry of the Ammonia Pressure Process for Leaching Ni, Cu and Co from Sherritt Gordon Sulphide Concentrates", *Journal of Metals*, Mar. 1955, pp. 457–463.

Boldt, J., *The Winning of Nickel*, Longmans Canada Ltd., Toronto (1967), pp. 290–297, 299–305.

Snyder et al., "Operation and Performance of Bench Scale Reactors", *Industrial and Engineering Chemistry*, vol. 49, No. 4, Apr. 1957, pp. 689–695.

Perry et al., *Chemical Engineer's Handbook*, 4th Edition.

*Primary Examiner*—Brian E. Hearn
*Attorney, Agent, or Firm*—Sigalos & Levine

[57] ABSTRACT

Copper, nickel and zinc are recovered from sulfide minerals or concentrates thereof by leaching with ammonia at or near atmospheric pressure. A slurry of such minerals or concentrates in an aqueous solution containing free ammonia is passed into a closed leaching vessel or a series of such vessels into which oxygen is admitted. The slurry in such vessel or vessels is mechanically agitated with a vigor input of at least 0.05 horsepower per cubic foot and preferably while recirculating oxygen from above the slurry to well below its surface. The temperature of the slurry is maintained between 50° and 100° C. or up to the boiling temperature at the prevailing pressure, and the pH preferably is in the range from 9 to 11. Solids separated from the leach solution at the conclusion of such leaching operation may be releached for additional copper recovery by a similar leaching procedure in one or a series of leaching vessels. Recoveries of copper, nickel and zinc in the range from 90% to 95% can in many cases be obtained in a leaching time of 3 to 6 hours from ores and concentrates containing one or more of the minerals chalcocite, chalcopyrite, pentlandite and sphalerite. By similarly releaching the solid residue from the primary leaching operation, overall recoveries may in many cases be increased to 99%.

3 Claims, 10 Drawing Figures

(PROFILE 1, TEST I)

(PROFILE 2, TEST I)

(PROFILE I, TEST II)

(PROFILE 2, TEST II)

(PROFILE 1, TEST III)

(PROFILE 2, TEST III)

(PROFILE 1, TEST IV)

(PROFILE 2, TEST IV)

RECOVERY OF COPPER AND/OR NICKEL AND/OR ZINC

RELATED APPLICATIONS

This application is a continuation-in-part of our copending application Ser. No. 656,840, filed Feb. 10, 1976, which is a continuation of Ser. No. 457,269, filed Apr. 2, 1974, which, in turn, is a continuation-in-part of applications Ser. No. 232,454, filed Mar. 7, 1972, Ser. No. 265,709, filed June 23, 1972, Ser. No. 301,475, filed Oct. 27, 1972, (and which was a continuation-in-part of aforementioned Ser. No. 232,454), and Ser. No. 335,770, filed Feb. 26, 1973, (which was a continuation-in-part of Ser. No. 242,340, filed Apr. 10, 1972), and Ser. No. 438,649, filed Feb. 1, 1974, (and which was also a continuation-in-part of aforementioned Ser. No. 232,454). All the foregoing applications are now abandoned.

BACKGROUND OF THE INVENTION

Ammoniacal leaching of copper ores and concentrates has a long history. Leaching of native copper and of oxidized copper ores (copper oxides, copper carbonates, copper silicates, etc.) presents no substantial difficulty, for such materials react readily with ammoniacal leaching reagents when the leaching operation is carried out with free access of air. Ammonia leaching procedures have been employed since at least the early part of the twentieth century to recover copper from native and oxidized copper ores.

Sulfide copper, nickel and zinc minerals are also known to be soluble in ammoniacal solutions under oxidizing conditions. However, they are not as readily soluble as the oxidized copper minerals or native copper, and there are substantial differences in the ease with which different common sulfide minerals will dissolve. For example, chalcocite, $Cu_2S$, dissolves with least difficulty, covellite, $CuS$, and bornite, $Cu_5FeS_4$, dissolve quite readily, and chalcopyrite, $CuFeS_2$, pentlandite, $(Ni,Fe)_9S_8$, enargite, $Cu_3AsS_4$, and sphalerite, $ZnS$, dissolve only with considerable difficulty.

Proposals to recover copper from sulfide minerals by ammoniacal leaching go back as far as the late nineteenth century. For example, the Hirsching U.S. Pat. No. 581,160, granted Apr. 20, 1897, proposes to extract copper from copper sulfides by leaching with a solution of aqueous ammonia and a nitrate such as ammonium nitrate. None of these early procedures for direct leaching of copper sulfides ever proved practical, however, and most of the early workers in ammoniacal leaching turned to roasting the sulfides in air and then leaching the oxidized copper from the roasted product, as described for example in the Burghardt et al. U.S. Pat. No. 385,345, of June 29, 1897, and in the Jumau U.S. Pat. No. 883,961 of Apr. 7, 1908. Such procedure did not compete economically with conventional smelting techniques, and had no advantages otherwise to recommend it, and so found no practical utilization.

A few decades ago interest developed in a procedure for extracting nickel from its sulfide ores by treatment with an ammoniacal solution under oxidizing conditions at high temperature and pressure. Copper is frequently associated with nickel in such ores and the procedure was applied to the recovery of copper as well. Such procedure, as described for example in the Forward U.S. Pat. Nos. 2,576,314 granted Nov. 27, 1951, 2,726,934, granted Dec. 13, 1955, and 2,822,263 granted Feb. 4, 1958, involves preparing a slurry of the ground mineral in an aqueous ammonia solution and heating such slurry with active agitation in an autoclave for a period of several hours. Air and ammonia are fed into the autoclave, as required to supply the needs of the leaching reactions. Although the patents refer to conducting such a leaching operation at atmospheric pressure and at a temperature as low as 100° F., they recognize that under such conditions leaching proceeds much too slowly to be of commercial interest. Accordingly, they describe precedures involving temperatures approaching or above the boiling point (typically 175° F. to 225° F.) and pressures of 100 psi. or more.

Relatively little consideration has been given to the use of ammoniacal leaching for the recovery of zinc from its sulfide ores, although the facts that zinc forms complexes with ammonia and that zinc sulfide dissolve in ammoniacal solutions in the presence of suitable oxidants have long been known.

The procedures of the Forward patents are the only ammoniacal leaching procedures that have ever been found suitable for commercial use in the extraction of metal values from sulfide minerals. Such use, however, has been limited to treatment of nickeliferous minerals, including copper-bearing nickel ores and concentrates, at high pressures in autoclaves; and the high value of the nickel recovered has been necessary to support the relatively costly autoclaving operation. No successful commercial use of the process in the treatment of conventional copper or zinc ores or concentrates, in which copper or zinc is the primary or sole metal value, is known.

STATEMENT AND GENERAL DESCRIPTION OF THE INVENTION

The present invention relates to an improved process for leaching sulfide copper, nickel and zinc minerals with an ammoniacal solution to recover metal values, using leaching vessels which operate at atmospheric pressure. Thus, difficulties and expenses of high pressure or autoclave operations are avoided. The process permits high recoveries (up to 99%) from copper, nickel and zinc concentrates that contain substantial proportions of even such difficultly soluble minerals as chalcopyrite, pentlandite, enargite, and sphalerite. Moreover, the process operates at temperatures low enough to be generated and maintained for the most part autogenously by the exothermicity of the leaching reactions. The new leaching process avoids generation of sulfur oxides or other atmospheric pollutants from the copper sulfide minerals themselves, and it leaves in readily disposable solid form the substantial amount of iron sulfides (pyrites ans pyrrhotite) which almost invariably is present in sulfide ores and concentrates. The ammoniacal leach solution produced by the new process is readily treated to obtain metallic copper, metallic nickel or metallic zinc in marketable form, the regenerate the ammoniacal leach reagent, and to reject in solid form the sulfur content of the sulfide minerals themselves.

The method of the invention for recovering copper, nickel or zinc from finely divided sulfidic copper or nickel minerals comprises forming, in an aqueous solution containing ammonium sulfate and free ammonia (ammonium hydroxide), a slurry of said minerals ground substantially to the fineness of flotation concentrates, which slurry is passed into a closed leaching vessel. The leaching vessel operates at atmospheric pressure or so near atmospheric pressure (not exceeding 10 psig. and as subsequently determined not exceeding about 30 psig.—pounds per square inch gauge, or pounds per square inch above atmospheric pressure) that all the difficulties of high pressure or autoclave operations are avoided. The slurry temperature is maintained in the range from 50° C. to 100° C., (or even up to the boiling temperature at the prevailing pressure) and the body of slurry in the leaching vessel is mechanically agitated with a vigor input of at least 0.05 horsepower per cubic foot while oxygen is introduced into the agitated slurry at a substantial depth below the surface of such body in an amount sufficient to maintain an oxygen partial pressure of at least several psi. in the vessel. Slurry containing dissolved copper, nickel or zinc complexed with ammonia in the aqueous phase and mineral matter depleted in such metal in the solid phase is withdrawn from the vessel.

Vigorous mechanical agitation of the slurry, preferably by a motor driven impeller extending through the closed top of the leaching vessel, is of primary importance for securing a good extraction of metal in a reasonable period of time. Agitation vigor may with advantage be considerably higher than 0.05 horsepower per cubic foot—it may be upwards even of 0.1 horsepower input to the impeller per cubic foot of slurry in the vessel. With less vigorous agitation the efficiency and rate of metal dissolution are significantly reduced.

It is particularly desirable continuously to recirculate oxygen-bearing gas from above the body of slurry into said body at a substantial depth below the surface of the body during the course of the leaching operation. Such recirculation of oxygen may be carried out independently of the agitation of the slurry, by use of an external gas recirculation pump or blower drawing from the atmosphere above the slurry and discharging into the slurry at or near the bottom of the leaching vessel. Alternatively, recirculation of oxygen may be performed coincidentially with agitation by use of a subaeration type of impeller to agitate the slurry and at the same time to draw oxygen-bearing gas from above the surface of the slurry and discharge it into the slurry in the region of intense slurry agitation.

Forced recirculation of oxygen through the body of slurry is not essential in all cases to success of the new process, but it is important for securing a high degree of metal extraction in a minimum leach time, especially from difficultly soluble minerals.

Leaching may be carried out in a single leaching vessel, but for many if not most operations it is preferable to employ a series of leaching vessels through which the slurry is passed sequentially, and in each of which the slurry is agitated with a vigor of at least 0.05 horsepower per cubic foot, and in each of which oxygen is continuously recirculated from above the body of slurry to substantially below its surface. When a series of leaching vessels is employed, the temperature of the slurry is preferably maintained at least as high in each succeeding vessel of the series as in the preceding vessel; and in some it is advantageous to maintain the slurry temperature a few degrees C. higher in each succeeding vessel of the series, or at least in each of the first several successive vessels in the series, than in the preceding vessel.

The sulfidic minerals that may be leached by the method of the invention include copper, nickel and zinc ores and concentrates. Equivalent to such sulfidic materials for use in the process are native copper ore, other metallic copper products such as cement copper, and metallic nickel. Also, any naturally occurring or waste or intermediate product containing copper, nickel or zinc in the form of a sulfide are equivalent materials. Such metal values as molybdenum, silver and gold, and cadmium, which often are found in association with copper, nickel or zinc minerals in nature may or may not be present. The products which lend themselves especially well to treatment by the new process are conventional copper flotation concentrates, which generally contain chalcocite and frequently also chalcopyrite and other copper minerals, nickel flotation concentrates, which generally contain pentlandite and chalcopyrite and may also contain violarite, and zinc flotation concentrates which generally contain mainly sphalerite (courtzite) and often include marmatite and pribramite.

Whether or not the minerals being leached are flotation concentrates, they should be substantially as finely divided as flotation concentrates, i.e., they should be minus 200 mesh (Tyler seven series) and more usually minus 325 mesh. Such fine subdivision is important both to facilitate suspension of the mineral particles in the slurry and to minimize leaching time.

It is not essential that ammonium sulfate be present in the slurry as made up for introduction into the leaching vessel or vessels, but ammonium sulfate is formed by oxidation of the sulfide minerals during the leaching operation. Moreover, regenerated ammoniacal solution produced from the leach liquor product will generally contain at least some ammonium sulfate, so as a practical matter it is present in the solution throughout the process.

The pH of the aqueous phase of the slurry is preferably maintained in the range from 9 to 11 throughout the leaching operation, in order to insure the presence of free ammonia in optimum concentration for efficient conduct of the leach reactions. This may be done by adding free ammonia (preferably as gaseous ammonia) to the slurry in at least the first or first few leaching vessels. The concentration of free ammonia in each leaching vessel preferably is correlated with the temperature of the slurry in such vessel to maintain the pH of the slurry at a value between 9 and 11 such that the sum of the partial pressures of ammonia and water vapor over the slurry is at least several psi. (pounds per square inch) below the total pressure in the vessel. It is of course necessary for the total pressure to exceed the sum of the ammonia and water vapor partial pressures to allow for the admission of oxygen to the system, and it is desirable for the oxygen partial pressure to be at least several psi. and advantageously about 5 or 6 psi.

The invention particularly contemplates the use of commercially pure oxygen to supply oxygen to the system. The use of air involves adding a considerable partial pressure of nitrogen to the total pressure of the system; and since it is a major feature of the invention to operate at or not much above atmospheric pressure, it is best to add substantially pure oxygen and to avoid the continual addition of nitrogen which would accompany the addition of air.

The process of the invention can be carried out at atmospheric pressure. However, closed leaching vessels are necessary to avoid loss of free ammonia and otherwise to control conduct of the operation. Moreover, at the higher temperatures in the range necessary for reasonably rapid progress of the leaching reaction (50° to 100° C.) and at the preferred pH values in the range from 9 to 11, the sum of ammonia and water vapor partial pressures approaches closely to atmospheric. It is therefore advantageous to operate the leaching vessels under a positive pressure, which, however, should be low enough to permit using equipment (leaching vessels, gas seals for closed systems, shaft packings, etc.) designed essentially for atmospheric pressure, and to make unnecessary the more costly equipment required for autoclave operation. To this end a pressure below about 30 psig. should be used, and often it will be below 20 psig. or even below 10 psig.

When leaching copper concentrates containing several copper minerals differing in ease of solubility, using a series of separate leaching vessels, the more readily soluble copper sulfides dissolve first, in the first one or first few of the series of leaching vessels. These materials can be leached at the lower temperatures in the range from 50° C. to 100° C., and the reaction is favored by increasing the availability of free ammonia. Hence when thus leaching such materials the slurry temperature may be held near the low end of the range in the first leaching vessel and ammonia may be added at a rate sufficient to establish a pH in such vessel of about 10 or more. However, the pH should preferably not exceed 11, for then $Cu(OH)_2$ becomes a more stable copper product and inhibits the formation of the soluble ammonia complex. In the last leaching vessel of the series, where only the more difficultly dissolved copper sulfides are still in the solid phase, and where the temperature should be in the upper portion of the range to favor dissolution of these sulfides, the pH of the slurry is advantageously reduced to about 9.5 to insure an adequate oxygen partial pressure.

It is sometimes advantageous, in treating copper concentrates generally, to leach in a series of vessels, to maintain the temperature of the slurry in the first leaching vessel of the series in the range from 50° to 65° C., and to increase the slurry temperature about 5° C. in each subsequent vessel of at least the first several vessels of the series. In the case of concentrates in which mainly chalcocite is present, with but a small proportion or none of the more difficultly soluble copper sulfides, the slurry temperature in the first leaching vessel may be maintained in the range from 50° C. to 60° C., and the slurry may be discharged from the last vessel in the series at a temperature in the range from 65° C. to 75° or 80° C. But if the concentrates being treated comprise a substantial proportion of such difficultly soluble minerals as chalcopyrite and enargite, the temperature of the slurry in the first leaching vessel may be maintained in the range from 60° C. to 70° C., and the slurry in the last vessel in the series is then preferably at a temperature in the range from 70° C. to 80° or 90° C.

In treating nickel or zinc concentrates also it is generally advantageous to leach in a series of vessels. In leaching such materials it is desirable to maintain the temperature of the slurry above 60° or 65° C. For example, the temperature of the slurry in the first vessel of the series may be in the range from 65° to 70° or 80° C., and may be increased about 5° C. in each subsequent vessel of at least the first several vessels of the series. It should be warmed to above 90°, e.g. to the range of 90° to 100° C., in the later vessels, especially when leaching zinc concentrates.

However, it is not essential that the temperature increase from tank to tank when a series of leach tanks is used. All three of the metals, copper, nickel and zinc may be leached in accordance with the invention while maintaining the temperature of the slurry at substantially the same valve, within the range, from 50° to 100° C., in each leaching tank in the series.

When leaching zinc concentrate, as the slurry progresses through the series of leaching vessels, the zinc sulfide content of the solids diminishes, corresponding to continuous gradual oxidation of the sulfides. But the amount of dissolved zinc in the aqueous phase does not necessarily increase correspondingly. In fact, it has been noted that the amount of zinc in solution in the slurry at an intermediate stage of leaching, say in the third leaching tank in a series of five, may be substantially higher than at the end of the leaching operation, i.e., in the last tank of such a series, where the slurry temperature is maximum and ammonia partial pressure is low. A possible explanation for this phenomenon is that at the high temperature and low free ammonia content of the slurry at the end of the leach, a basic zinc ammonium sulfate is formed and separates from solution as a precipitate or crystalline solid. In any event, if the entire mass of slurry at the conclusion of the leaching operation is cooled and free ammonia is added to it, the amount of zinc in solution can be substantially increased to a maximum level.

Accordingly, it is preferred practice according to the invention, when leaching zinc concentrate, to introduce the slurry withdrawn from the last reaction vessel (where its temperature, for example, is 95° C. or more and where the ammonia partial pressure is only 2 or 3 psi.) into a holding vessel where it is cooled substantially (to below 80° C. and preferably to 70° C. or less) and to add free ammonia. This operation results in bringing into solution in the aqueous phase all ammonia-soluble basic zinc sulfate or other complexes that may have formed during leaching but which precipitated (or which did not dissolve) at the high temperatures and low ammonia levels prevailing in the last vessels of the series.

The leaching reactions are exothermic and release enough heat to bring the temperature of the leach solution to the desired value and to maintain it there, especially in the first leaching vessels of the series, or otherwise in the initial stages of the leaching process, where the rate of metal dissolution is greatest and where consequently most of the metal is dissolved. Indeed, it is necessary in many cases to provide for cooling the slurry in the first one or few leaching vessels of a series to hold the temperature to the desired value. This can be done, of course, by providing cooling coils in the vessels, or surrounding them with cooling jackets. In the last vessel or vessels of the series, or the last stages of the leaching process, where most of the metal values have been extracted from the solids and where dissolution of remaining undissolved metal proceeds slowly, the heat released by the leaching reaction may be insufficient to develop and maintain the relatively high temperatures to which the slurry in these vessels should be heated or at which it should be maintained. Hence here it may be necessary to supply heat to the slurry, by providing heating coils in the vessel or vessels or heating jackets around it or them.

The time required for the leaching operation is generally in the range from 3 to 8 hours, 5 to 7 hours being typical. When leaching is carried out in a series of vessels, this is the transit time for the slurry through the entire series. It is generally possible in such a length of time to extract into the aqueous phase about 90% or more of the copper, nickel or zinc content of a typical sulfide concentrate containing significant proportions of chalcopyrite, pentlandite, sphalerite and other relatively difficultly soluble copper, nickel or zinc minerals. Substantially shorter leaching times suffice when the leaching operation is carried out at pressures slightly above atmospheric (e.g. at 15 to 25 psig.).

The aqueous phase of the slurry withdrawn from the last leaching vessel in the series contains the dissolved copper, nickel or zinc in the form of a metal ammonium complex, and it contains the sulfur component of the dissolved copper minerals in the form of ammonium sulfate. It also contains residual free ammonia, and some small amounts of sulfamates and thionates. The solid phase, depleted in weight and bulk by the amount of the dissolved copper, nickel or zinc minerals, contains substantially all the remainder of the incoming material. For example, it contains unaltered the pyrites and pyrrhotite content of the concentrates, and such earthy materials as silica and alumina. It will also contain any insoluble metal values such as silver and gold, and molybdenum sulfide.

The copper-rich or nickel-rich or zinc-rich aqueous phase is separated from the solid phase. The former then may be treated in any conventional manner to recover its metal content, to regenerate ammonium sulfate solution or free ammonia or both for reuse in the process, and to separate excess sulfate produced by oxidation and dissolution of the sulfide component of the minerals.

The solid phase, which may be separated from the liquid phase of the slurry at the conclusion of the leaching operation by any conventional procedure, such as decantation thickening or filtration, may be discarded. However, it may contain significant quantities of leachable metal values and the invention contemplates, as an optical procedure, treating the separated solids by releaching in a secondary leaching operation. The secondary leaching operation particularly contemplated by the invention involves reslurrying the separated solids in an aqueous ammonium sulfate solution containing free ammonia, and then treating them in a closed releaching vessel in a manner generally similar to that used in the primary leaching operation. The slurry is preferably brought to a lower pH and to a higher temperature than that prevailing during the primary leaching operation, while mechanically agitating the slurry in the releaching vessel with a vigor input of at least 0.05 horsepower per cubic foot of slurry and while introducing oxygen into the agitated slurry at a substantial depth below its surface, and preferably also while recirculating oxygen-bearing gas from above the body of slurry in said vessel into said body at a substantial depth below its surface. Thereafter the metal-bearing aqueous phase is separated from the metal-depleted solid phase. The former may be united with the aqueous phase from the primary leaching operation, and the latter may be discarded or may be further treated to recover its residual metal values such as silver, gold, molybdenum, or cadmium.

Since the solids treated in the releaching operation contain the more difficultly soluble components of the original feed material, the releaching operation ordinarily proceeds more slowly than the primary leaching operation. But since the volume of solids is small relative to that fed into the primary leaching operation, very large equipment is not required to provide for a relatively long releach time.

Ammonia gas is fed into the releaching operation, as it is to the primary leaching operation, to maintain the pH of the aqueous phase of the slurry at an optimum value, typically 9.5 but more generally in the range from 9.3 to 9.7. Heat may have to be supplied to bring the slurry in the releaching vessel to the desired value, which generally is in the range from 70° C. to 90° C., say 75° or 80° C. in a typical case.

Releaching may often be carried out in a single vessel; but it may also be conducted in a series of vessels through which the slurry flows sequentially. In the latter case it is sometimes desirable, as in the primary leaching operation, to maintain the temperature of the slurry higher and its pH lower in the second vessel of the series than in the first. For example, it may be 2° to 5° C. warmer, and have a pH of say 9.4 in the second vessel rather than the pH of 9.5 or 9.6 in the first vessel.

The releaching operation will in most cases serve to recover 90% or so of the copper, nickel or zinc present in the solids discharged from the primary leach. Thus overall a copper, nickel or zinc recovery of 99% or thereabouts may be obtained from the original concentrates or other starting material.

Figure 1:
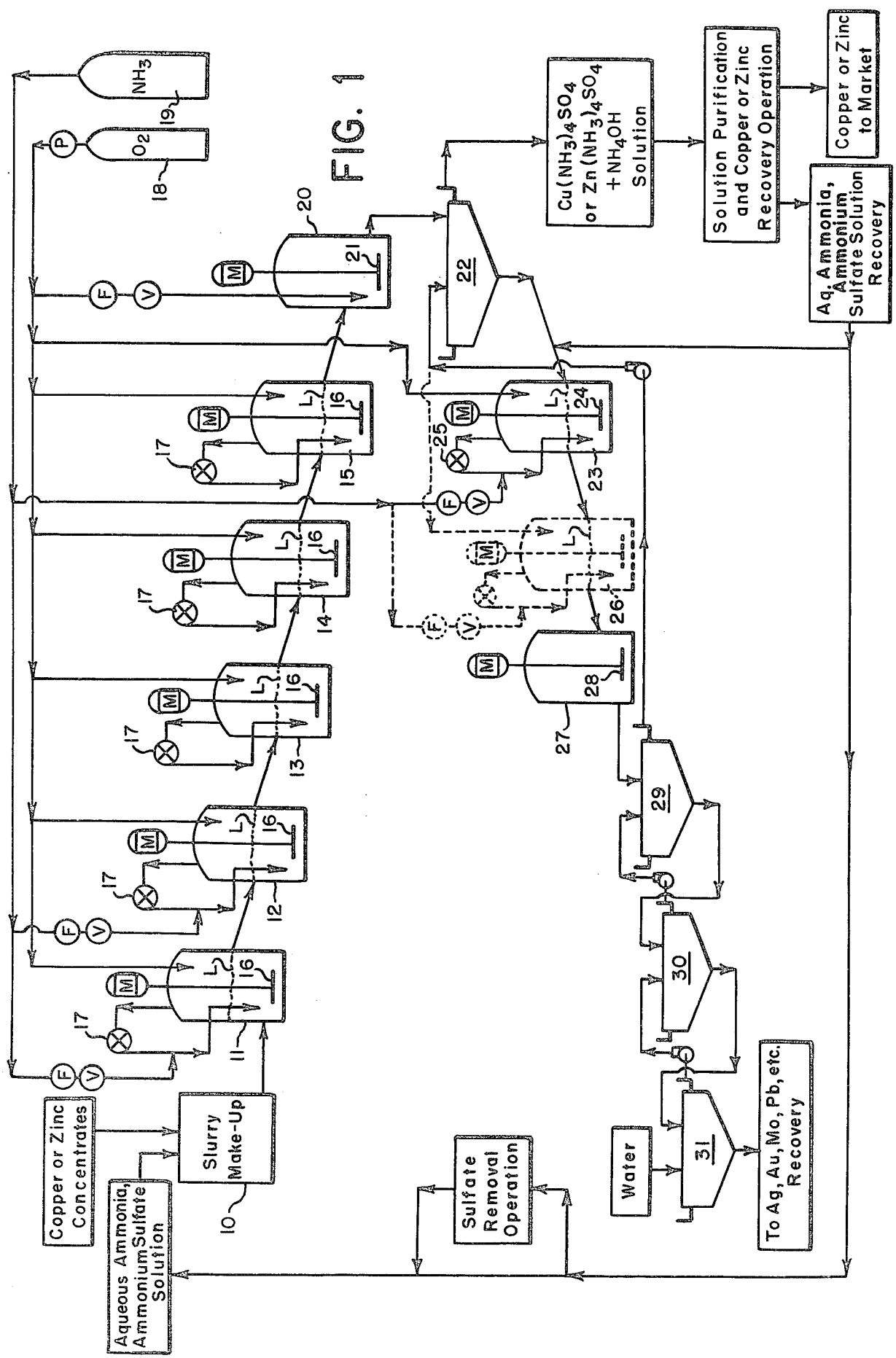
FIG. 1 is a flow-sheet of an advantageous embodiment of the invention diagrammatically portraying apparatus that may be used for leaching copper or zinc concentrates.

Although the flowsheet of FIG. 1 particularly refers to and is described below with respect to, the leaching of copper and zinc concentrates, it is entirely feasible to leach nickel concentrates in a system according to the flowsheet of FIG. 1. Likewise, although the flowsheet of FIG. 2 particularly refers to, and is described below with respect to, the leaching of nickel concentrates, it is equally feasible to leach copper or zinc concentrates in a system according to the flowsheet of FIG. 2. Other departures from the flowsheets and from the leaching procedures described below with reference to them may also be made without departing from the scope of the invention. For example, as noted above, commercially attractive and successful leaching systems in accordance with the invention may in some cases be based on utilizing only a single leaching vessel in place of the series of leaching vessels shown in the drawings, as when the overall treatment scheme in which the leaching operation is incorporated does not require maximum or even very high extraction of copper, nickel or zinc from the concentrates or other material being leached.

DESCRIPTION OF FIG. 1 EMBODIMENT

In the embodiment of the invention shown on the flowsheet of FIG. 1, finely divided copper or zinc concentrates (preferably ground to minus 325 mesh) are formed into a slurry with aqueous ammonia-ammonium sulfate solution in a closed slurry preparation vessel 10. The slurry then flows by gravity or is pumped to the first of a series of primary leaching vessels 11, 12, 13, 14 and 15. The slurry is maintained to a depth indicated by the surface level L in each of the leaching vessels and flows by gravity sequentially through the series. Each of the closed vessels 11 to 15 may be provided with internal coils or surrounding jackets (not shown) for circulating heating or cooling medium in heatexchange relation with slurry therein. Each vessel is provided with an agitator impeller 16 driven by a motor M for vigorously agitating the slurry. The motors M each are sufficiently powerful so that in normal operation they drive each impeller 16 at speed great enough to require the continuous input to each impeller shaft of at least 0.05 horsepower per cubic foot of slurry being agitated by this impeller. Each vessel also is equipped with an external gas recirculating pump or blower 17 for continuously and vigorously recirculating gas from above the surface level L of the slurry to a point deep below such surface level. In place of the external recirculation pumps 17, each impeller 16 may be of the sub-aeration type so as to effect internal recirculation of the gas from above the surface level L to below such level.

All this equipment, including seals for the impeller shafts, is constructed for operation at substantially atmospheric pressure. No special high-pressure autoclave construction or design is needed. It is sufficient that the slurry-containing equipment be enclosed to confine the ammonia oxygen and water vapor.

Oxygen is supplied to each of the leaching vessels 11 to 15 from a supply tank 18. The oxygen is delivered at a low superatmospheric pressure such as 6 psig. through a pressure regulating valve P, and it maintains such pressure in each leaching vessel. Gaseous ammonia is supplied to each of the first vessels 11 and 12 from a supply tank 19 through flowmeters F and valves V—by which the rate of admission of the ammonia to each of these two vessels may be independently controlled.

Slurry is discharged from the last leaching vessel 15 in the series into a storage or holding tank 20 equipped with an agitation impeller 21 driven by a motor M. The holding tank may be equipped with a cooling coil or jacket (not shown) for the purpose of reducing the temperature of the slurry delivered to it from the last leaching vessel 15. It also (optionally) is supplied with free ammonia from the supply tank 19 through a flowmeter F and valve V. From the tank 20 the slurry flows into a thickener 22 from which the liquid phase containing dissolved copper or zinc overflows and from which the solids are collected in the form of a thickened mud underflow. The overflow solution is treated for copper or zinc recovery and to regenerate aqueous ammonia ammonium sulfate solution which is recycled to the slurry make-up tank 10 for preparing additional slurry for leaching. A bleed side stream is taken from the regenerated solution to separate excess sulfate dissolved from the copper or zinc sulfide concentrates, and the ammonia recovered thereby is returned to the stream recycling to the slurry make-up tank (or it may be passed to ammonia storage).

The underflow from the thickener 22 is re-slurried or mixed with recovered aqueous ammonia-ammonium sulfate solution and is introduced into a secondary leaching tank 23. This tank is in all essential respects of the same design as the primary leaching tanks 11 to 15. It is equipped with an agitation impeller 24, which in normal operation is driven by a motor M at a velocity calling for a power input to the impeller shaft of at least 0.05 horse power per cubic foot of agitated slurry, with an external pump or blower 25 for vigorously recirculating gas from above the liquid surface level L of slurry in the vessel to deep below such surface, and with connections for supplying oxygen from the tank 18 and ammonia from the tank 19 through a flowmeter F and valve V. In place of the external recirculation pump 25, internal gas recirculation may be provided by the use of a subaeration type of impeller 24. Optionally a second secondary leaching tank 26, equipped similarly to the first such tank 23, may be provided to receive the slurry outflow from the first tank.

The slurry discharged from the secondary leach tank 23, or from the second such tank 26 if provided, is delivered into a storage or holding tank 27 equipped with a motor-driven impeller 28. From this holding tank the slurry flows into the first of a series of thickeners 29, 30 and 31 where it is subjected to countercurrent washing with water. The advanced wash water joins with the copper-bearing or zinc-bearing leach solution decanted as overflow from the first thickener 29, and this solution is fed with the slurry from the primary leaching operation into the thickener 22 from which the clarified copper-bearing or zinc-bearing solution product of the leaching process is taken. The final washed underflow product from the last thickener 31 in the washing series is substantially completely depleted in copper or zinc and is sent to treatment for recovery of such values as it may contain (e.g. silver, gold, molybdenum sulfide, lead, etc.) or is discarded.

EXAMPLE 1

Following is an example of the process of the invention for recovering copper from copper concentrates, as carried out in the apparatus and with the sequence of steps described above with reference to FIG. 1.

Copper concentrates containing 30% by weight copper, largely in the form of chalcocite but also in substantial proportion as other minerals including covellite, enargite and chalcopyrite, are slurried in the tank 10 with an aqueous solution of ammonium sulfate and ammonium hydroxide containing 87 grams per liter of ammonia (both free and combined) and substantially no dissolved copper. This slurry is mixed in the proportions of about 1250 gallons of solution to 2500 pounds of wet concentrates (containing 20% by weight water), forming a slurry containing about 15% solids by weight. This slurry is pumped continuously into the first of the primary leaching tanks 11 and it flows from tank to tank through the series of gravity.

Commerically pure oxygen is fed into the first (and each subsequent) tank at 6 psig. through the pressure regulating valve P, and thereby the pressure in the series of leaching tanks is established at that value. Gaseous ammonia is metered into each of the first two tanks 11 and 12 through the appropriate flow meters and valves at a rate sufficient to maintain the pH of the slurry in these tanks at about 9.9. This calls for a flow of ammonia into each tank at the rate of about 5.3 standard cubic feet per minute.

The slurry in each of the first two tanks (and in each other tank as well) is vigorously agitated by the impellers 16. Each tank contains about 60 gallons (about 8 cubic feet) of slurry, and the impeller of each tank absorbs about 0.6 horsepower, corresponding to agitation with a vigor of substantially 0.075 horsepower per cubic foot of slurry.

The oxygen-bearing gas overlying the slurry level L in each of the five leaching tanks is vigorously circulated by the pump 22 into the slurry at a point near the bottom of the tank. The rate of such recirculation diminishes from tank to tank in conformity with the slowing down of the dissolution reactions as the slurry solids become depleted in the more readily soluble copper minerals. The rate of such circulation, in standard cubic feet per minute, is approximately 22 in the first tank 11, 14 in the second tank 12, 7.3 in the third tank 13, 4.7 in the fourth tank 14, and 2.1 in the fifth tank 15.

In the first tank 11, where the rate of copper dissolution is maximum and where almost half of the total copper content of the concentrates dissolves, the temperature of the slurry is maintained at about 55° C. This requires cooling of the slurry by circulation of cooling water through cooling coils disposed in the tank, because of the large amount of heat released by the exothermic dissolution reactions. In the second tank 12 the temperature of the slurry is raised to about 60° C.; and here also it is necessary to cool the slurry to maintain it at this temperature. In this tank approximately another 25% of the total copper content of the concentrates dissolves, with a corresponding large heat release which is more than enough to raise the slurry temperature to the desired value and hold it there.

No gaseous ammonia is added to the slurry in the third, fourth and fifth tanks 13, 14 and 15, and consequently the pH of the aqueous phase diminished as the slurry passes through these tanks and additional copper is dissolved. In the third tank 13 the pH of the solution falls to about 9.7 while the temperature is raised to 65° C. The reduction in pH here is important in view of the rise in temperature, in order to maintain the sum of the partial pressure of ammonia and water vapor well below the 6 psig. established by the oxygen supply system and to maintain ample oxygen in the tank for efficient progress of the leaching reactions. Here the rate of copper dissolution is reduced, however, because the remaining copper minerals in the solid phase are mostly of difficultly soluble species. As a consequence, the heat released is only about enough to establish and maintain the desired slurry temperature. No cooling of the slurry is necessary, but on the other hand no heat is required to hold it close to the desired 65° C. Approximately 10% of the copper content of the concentrate is dissolved in this tank.

In the fourth and fifth tanks 14 and 15 the pH of the aqueous phase of the slurry is about 9.6 and 9.5 respectively, and the temperature is held close to 70° C. in both tanks. The rate of copper dissolution in these tanks is slow, and in both tanks the slurry may be heated by circulation of heating fluid through coils in the tanks to establish and maintain the desired slurry temperature.

The retention time of the slurry in each tank is about one hour, so that the duration of the primary leach is in total about five hours.

The aqueous phase of the slurry from the first tank contains about 22 g/l copper, that from the second tank contains about 35 g/l copper, that from the third contains about 42 g/l copper, and that from the fourth contains about 46 g/l copper. The final slurry discharged into the tank 21 has in its aqueous phase about 50 g/l copper, about 130 g/l total ammonia (of which about 10 g/l is free ammonia), and 54 g/l ammonia complexed with copper, and about 150 g/l sulfate ion. The solid phase of this slurry amounts to only about 1100 pounds out of each ton of dry concentrates charged into the system. It contains all the pyrites and gangue (silica, alumina, etc.) constituents of the concentrates, and all the undissolved metal values such as gold and silver, including about 10% of the original copper content, the latter mostly in the form of the difficultly soluble minerals chalcopyrite and enargite.

The slurry collected in the tank 20 (to which no ammonia need be added) is decanted in the thickener 22 to separate the aqueous phase as a clarified solution which can be treated for recovery of its copper content in metallic form and for recovery of ammonium sulfate-ammonium hydroxide solution for recycling to prepare fresh slurry with incoming concentrates.

The thickened underflow from the thickerer 22 contains about 65% by weight solids. This slurry is diluted to 50% solids by fresh ammonium sulfate-ammonium hydroxide solution and is introduced into the secondary leach tank 23. Here it is vigorously agitated similarly to the slurry in the primary leaching tanks, and the pH of the aqueous phase is brought to and maintained at about 9.6 by the introduction of gaseous ammonia at the rate of about 0.7 standard cubic foot per minute. Concurrently commercially pure oxygen is introduced at about 6 psig. As in the primary leaching operation, the oxygen-bearing gas overlying the body of agitated slurry is vigorously recirculated to near its bottom. The slurry is heated to about 75° C. by circulation of heating fluid through coils in the vessel.

The rate of flow of slurry through the secondary leaching tank 23 is slow so that the retention time therein is about six hours. The flow through this tank and into the agitated storage tank 27 is by gravity. Approximately 90% of the copper content of the solid phase of the slurry fed into the secondary leaching tank 23 is dissolved in this tank, yielding substantially 99% recovery of copper from the original concentrates in the combined primary and secondary leaching operation.

The slurry collected in the secondary leach storage tank 27 contains in its aqueous phase about 68 g/l copper and 150 g/l ammonium ion (ammonium sulfate plus ammonium hydroxide). It also contains about 160 g/l sulfate. The solid phase of the slurry is substantially completely depleted in copper, but contains recoverable silver and gold values.

The slurry is fed from the storage tank 27 into the series of countercurrent washing thickeners 29, 30 and 31. The aqueous phase overflowing the first thickener is united with the slurry from the primary leaching operation in the thickerner 22. The solids content of the slurry from the secondary leach is washed substantially free of copper and collected as thickened mud containing only about one half the total weight of concentrates fed into the system and assaying only about 0.6% copper.

EXAMPLE 2

Following is an exemplary embodiment of the process according to the invention for recovering zinc from zinc concentrates, as carried out in the apparatus and with the sequence of steps described above with reference to FIG. 1.

Zinc concentrates containing 50% by weight zinc, largely in the form of sphalerite (or wurtzite) but also in substantial proportion as other minerals including marmatite and pribramite, are slurried in the tank 10 with an aqueous solution of ammonium sulfate and ammonium hydroxide containing 87 grams per liter of ammonia (both free and combined) and substantially no dissolved zinc. This slurry is mixed in the proportions of about 1250 gallons of solution to 1250 pounds of wet concentrates (containing 20% by weight water), forming a slurry containing about 8% solids by weight. This slurry is pumped continuously into the first of the primary leaching tanks 11 and it flows from tank to tank through the series by gravity.

Commercially pure oxygen is fed into the first (and each subsequent) tank at 6 psig. through the pressure regulating valve P, and thereby the pressure in the series of leaching tanks is established at that value. Gaseous ammonia is metered into each tank through the appropriate flow meters and valves. The rate of flow of ammonia into each tank is held to only about the rate at which it is being consumed in such tank. Flow rate of ammonia into each tank is reduced or increased as required to hold the rate of oxygen flow into such tank constant at the established oxygen pressure (6 psig.).

The slurry in each tank is vigorously agitated by the impellers 16. Each tank contains about 60 gallons of slurry, and the impeller of each tank absorbs about 0.6 horsepower, corresponding to agitation with a vigor of substantially 0.1 horsepower per cubic foot of slurry.

The oxygen-bearing gas overlying the slurry level L in each of the five leaching tanks is vigorously circulated by the pump 22 into the slurry at a point near the bottom of the tank. The rate of such recirculation diminishes from tank to tank in conformity with the slowing down of the dissolution reactions as the slurry solids become depleted in the more readily soluble zinc minerals. The rate of such circulation, in standard cubic feet per minute, is approximately 22 in the first tank 11, 14 in the second tank 12, 7.3 in the third tank 13, 4.7 in the fourth tank 14, and 2.1 in the fifth tank 15.

In the first tank 11, where the rate of zinc dissolution is maximum and where almost one third of the total zinc content of the concentrates dissolves, the temperature of the slurry is maintained at about 70° C. This requires cooling of the slurry by circulation of the cooling water through cooling coils disposed in the tank, because of the large amount of heat released by the exothermic dissolution reactions. In the second tank 12 the temperature of the slurry is raised to about 75° C., and here also it is necessary to cool the slurry to maintain it at this temperature. In this tank approximately another 20% of the total zinc content of the concentrates dissolves, with a corresponding large heat release which is more than enough to raise the slurry temperature to the desired value and hold it there. In the third tank 13 the temperature is raised to 85° C. In view of this rise in temperature, in order to maintain the sum of the partial pressure of ammonia and water vapor well below the 6 psig. established by the oxygen supply system and to maintain ample oxygen in the tank for efficient progress of the leaching reactions, the amount of free ammonia and consequently the ammonia partial pressure in the slurry entering this tank from the second tank 12 must be low. It is for that reason that the rate of ammonia addition to each of the first tanks is balanced to about equal the rate of ammonia consumption therein. In this third tank 13 the rate of zinc dissolution is reduced because the remaining zinc minerals in the solid phase are the most difficultly soluble. As a consequence the rate of heat released is only about great enough to establish and maintain the desired slurry temperature. No cooling of the slurry is necessary, but on the other hand no heat is required to hold it close to the desired 85° C. Approximately 20% of the zinc content of the concentrate is dissolved in this tank.

In the fourth and fifth tanks 14 and 15 the temperature is held at about 90° C. and 95° C. respectively. The rate of zinc dissolution in these tanks is slow, and in both tanks the slurry is heated by circulation of heating fluid through coils in the tanks to establish and maintain the desired slurry temperature.

The retention time of the slurry in each tank is about one hour, so that the duration of the primary leach is in total about five hours.

The aqueous phase of the slurry from the first tank contains about 13 g/l zinc, that from the second tank contains about 24 g/l zinc, from the third contains about 35 g/l zinc, and that from the fourth contains about 42 g/l zinc. The final slurry discharged into the tank 21 has in its aqueous phase about 47 g/l zinc, about 110 g/l total ammonia, about 54 g/l ammonia complexed with zinc, and about 150 g/l sulfate ion. In the holding tank 21 the solution is cooled by circulation of coolant through cooling coils (not shown) to about 70° C., and free ammonia is admitted to the solution in an amount corresponding to about 10 g/l. Thereby insoluble basic zinc ammonium sulfate formed in the leaching tanks is dissolved, with an increase in the dissolved zinc content of the aqueous phase to about 50 g/l, and an increase in the dissolved residual free ammonia therein to about 3 to 5 g/l. The solid phase of this slurry amounts to only about 500 pounds out of each ton of dry concentrates charged into the system. It contains all the pyrites and gangue (silica, alumina, etc.) constituents of the concentrates, and all the undissolved metal (not shown) with which the tank is provided, and free ammonia is introduced into the cooled slurry in an amount corresponding to about 10 g/l. This treatment dissolves such undissolved basic zinc sulfate as has been formed during the releaching operation. The resulting aqueous phase discharged from the tank 27 contains about 52 g/l zinc and 120 g/l ammonium ion (ammonium sulfate plus ammonium hydroxide). It also contains about 160 g/l sulfate and a very low concentration of free ammonia (a few g/l). The solid phase of the slurry is substantially completely depleted in zinc, but contains recoverable silver and gold values.

The slurry is fed from the storage tank 27 into the series of countercurrent washing thickeners 29, 30, 31. The aqueous phase overflowing the first thickener is united with the slurry from the primary leaching operation in the thickener 22. The solids content of the slurry from the secondary leach is washed substantially free of zinc and collected as thickened mud containing only about one quarter the total weight of concentrates fed into the system and assaying only about 8% zinc.

DESCRIPTION OF FIG. 2 EMBODIMENT

Figure 2:
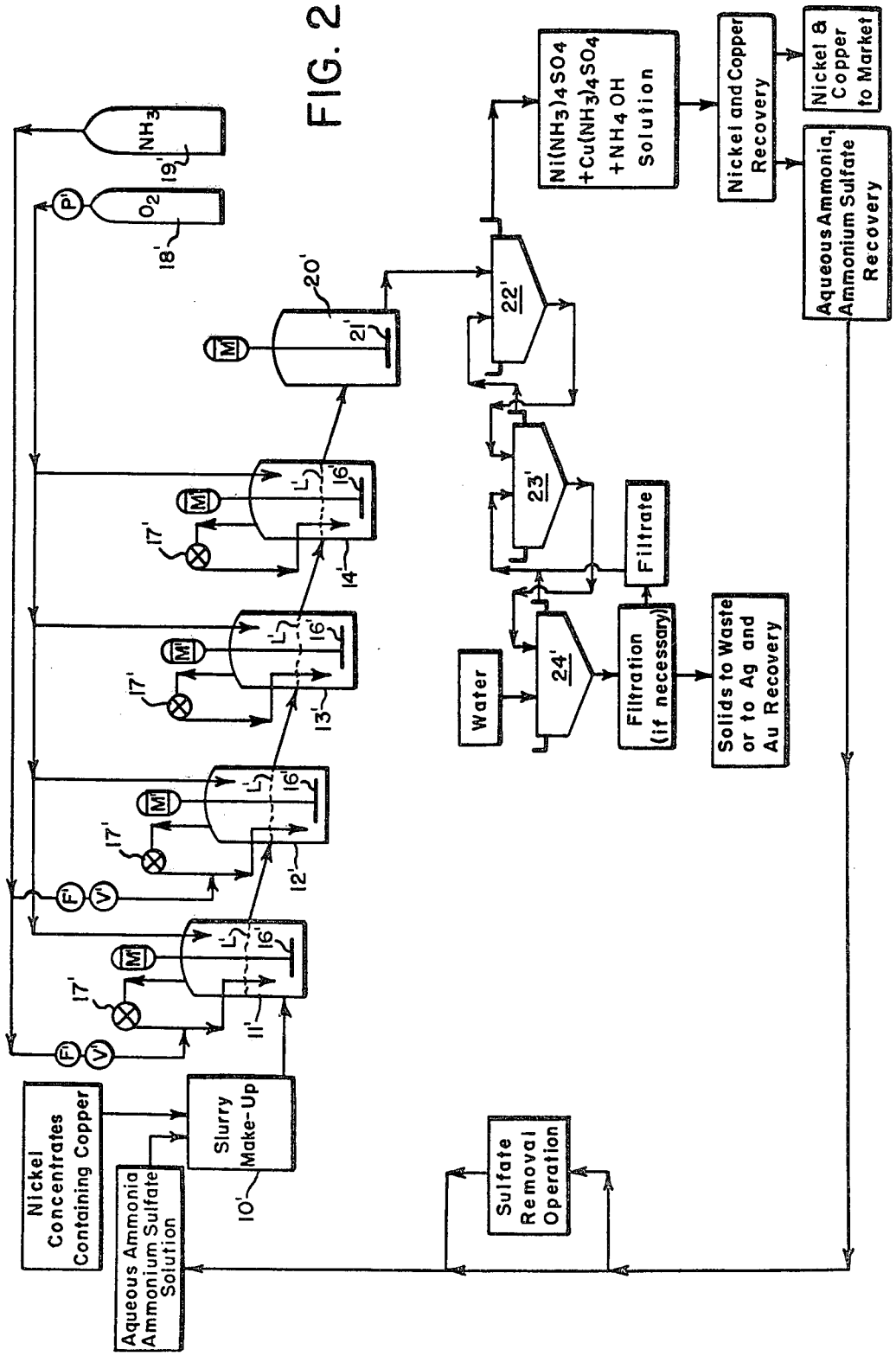
FIG. 2 is a flow-sheet of an advantageous embodiment of the invention portraying apparatus that may be used for leaching nickel concentrates.
Figure 3:
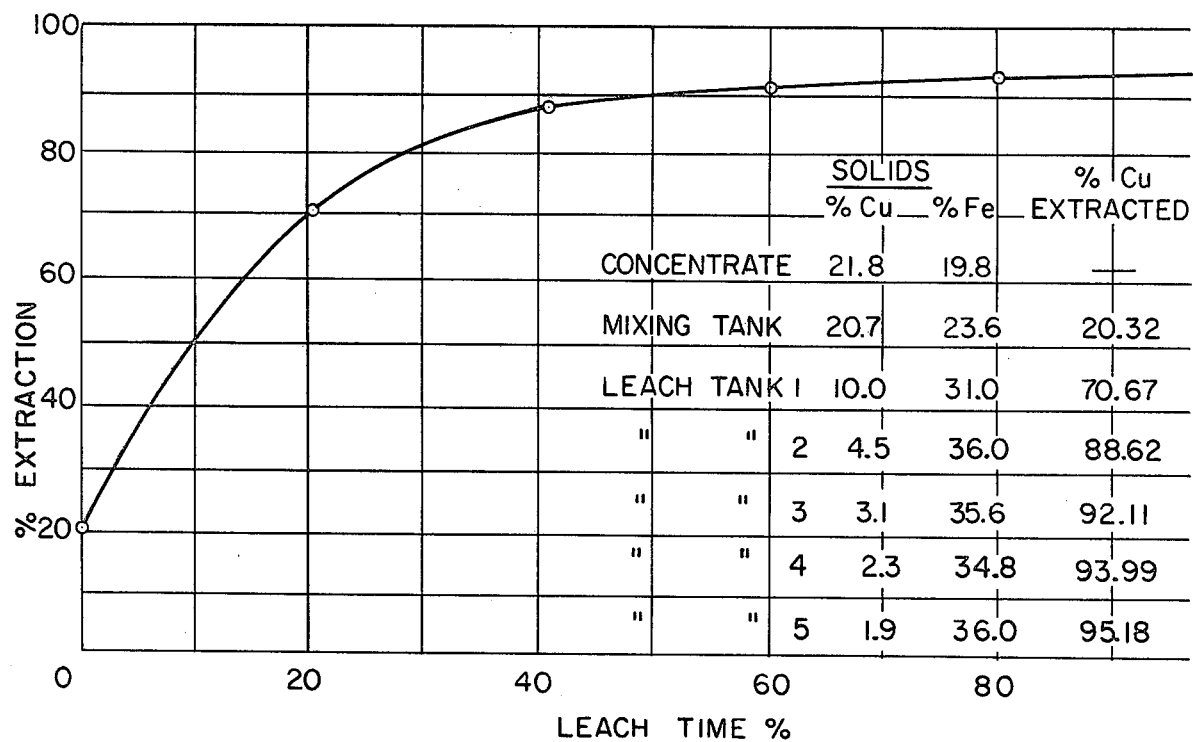
FIGS. 3–10 show leach profiles taken in test data by the procedures of example 5.
Figure 4:
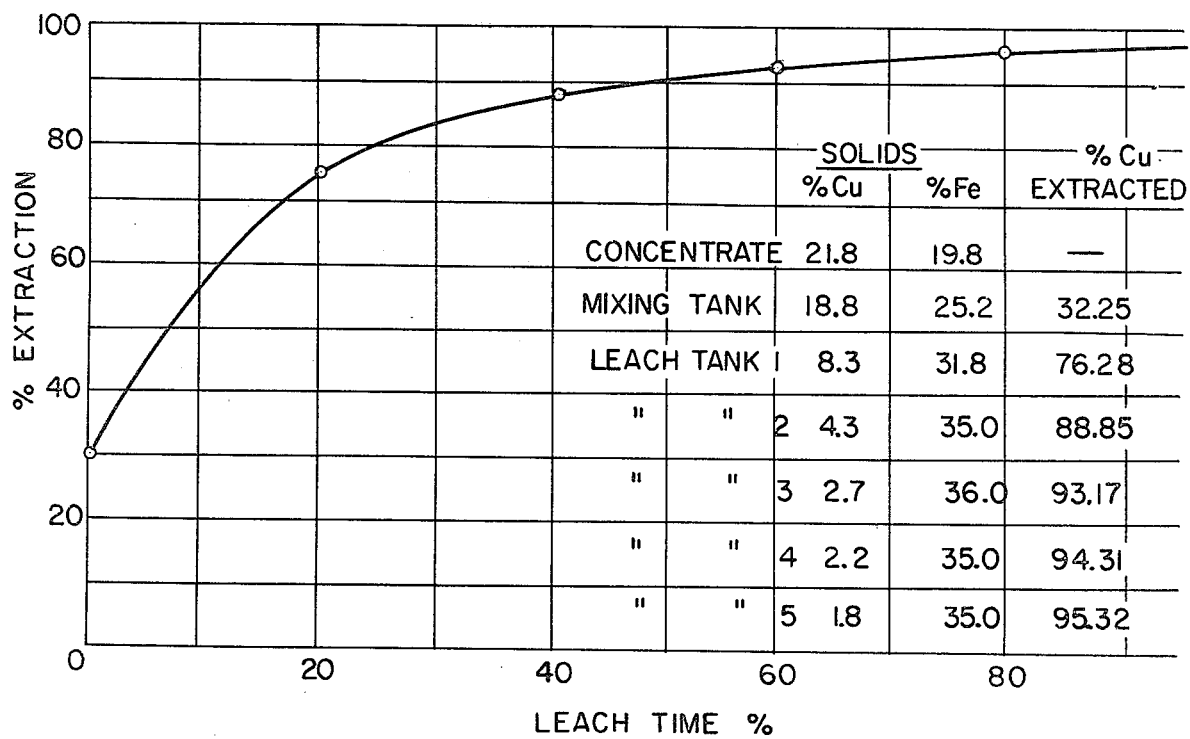
Figure 5:
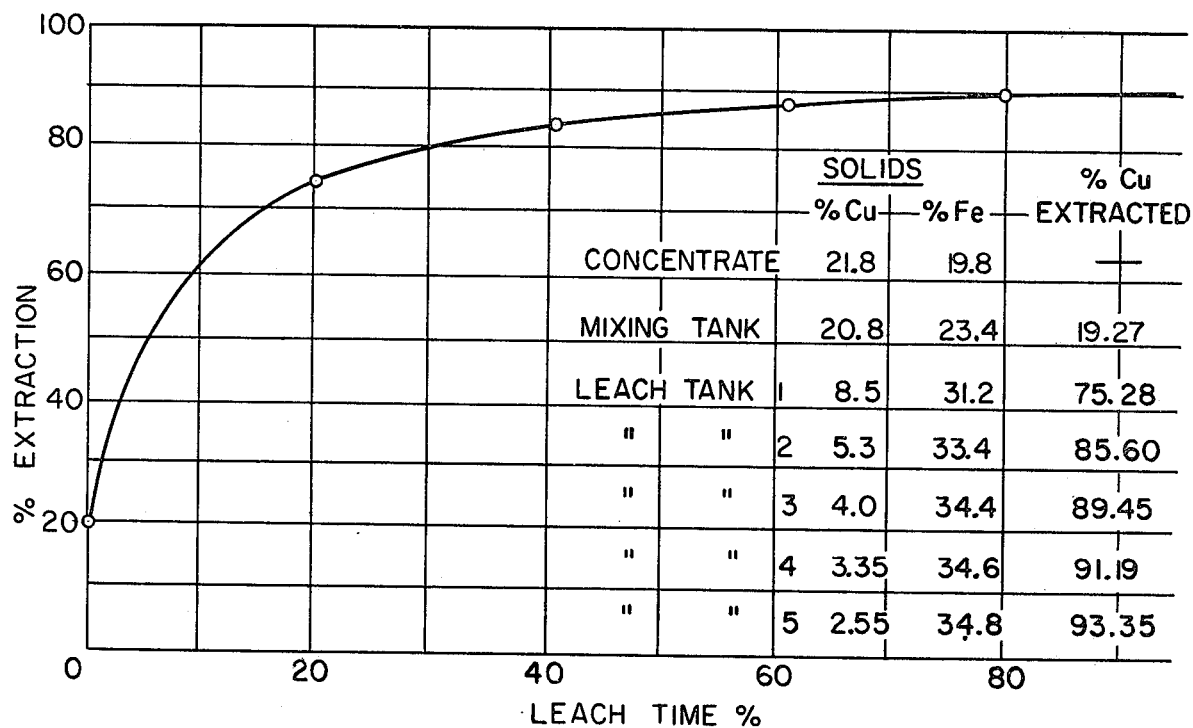
Figure 6:
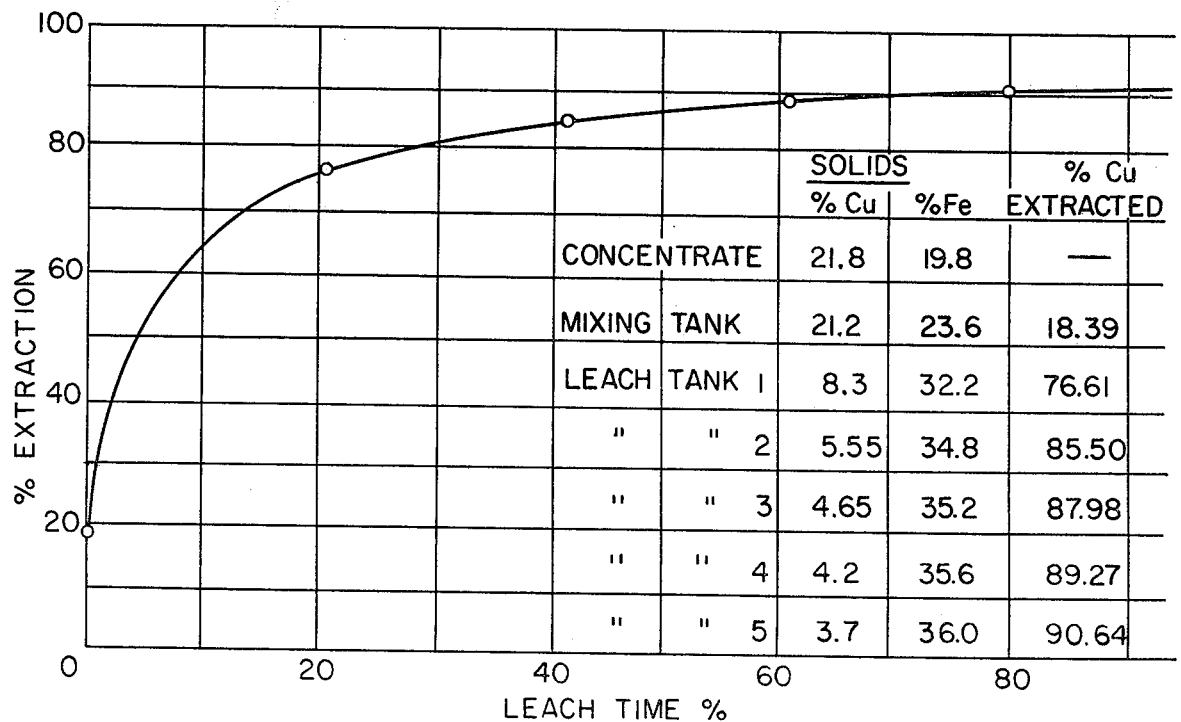
Figure 7:
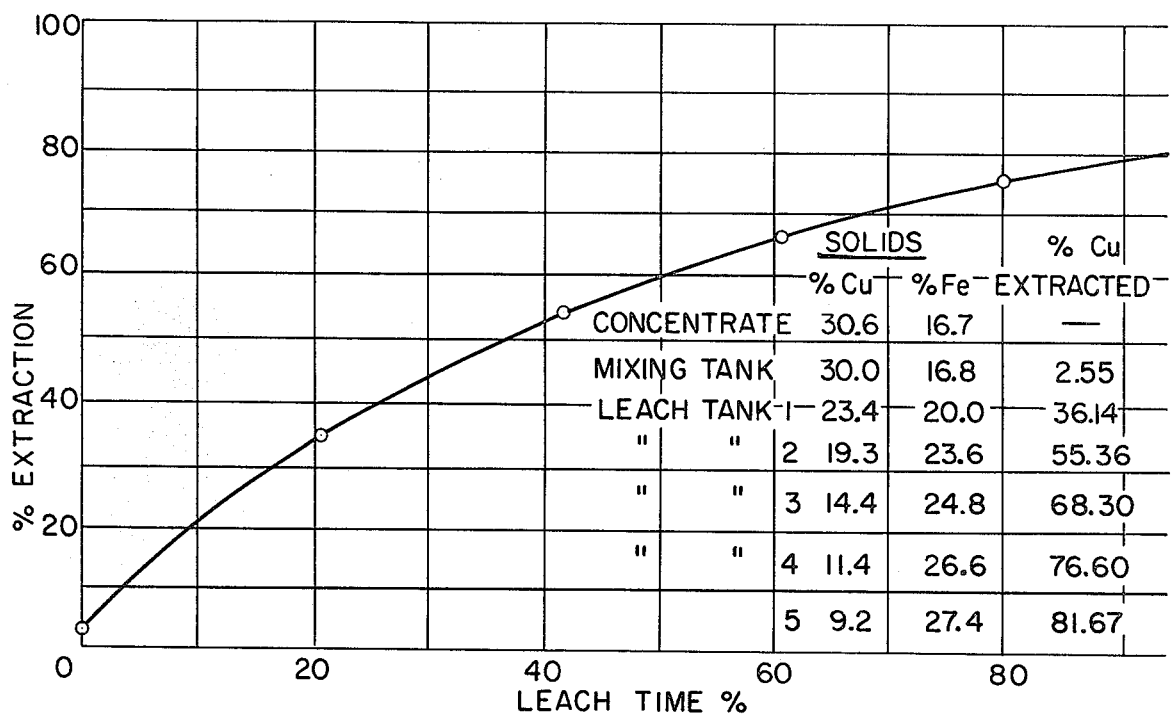
Figure 8:
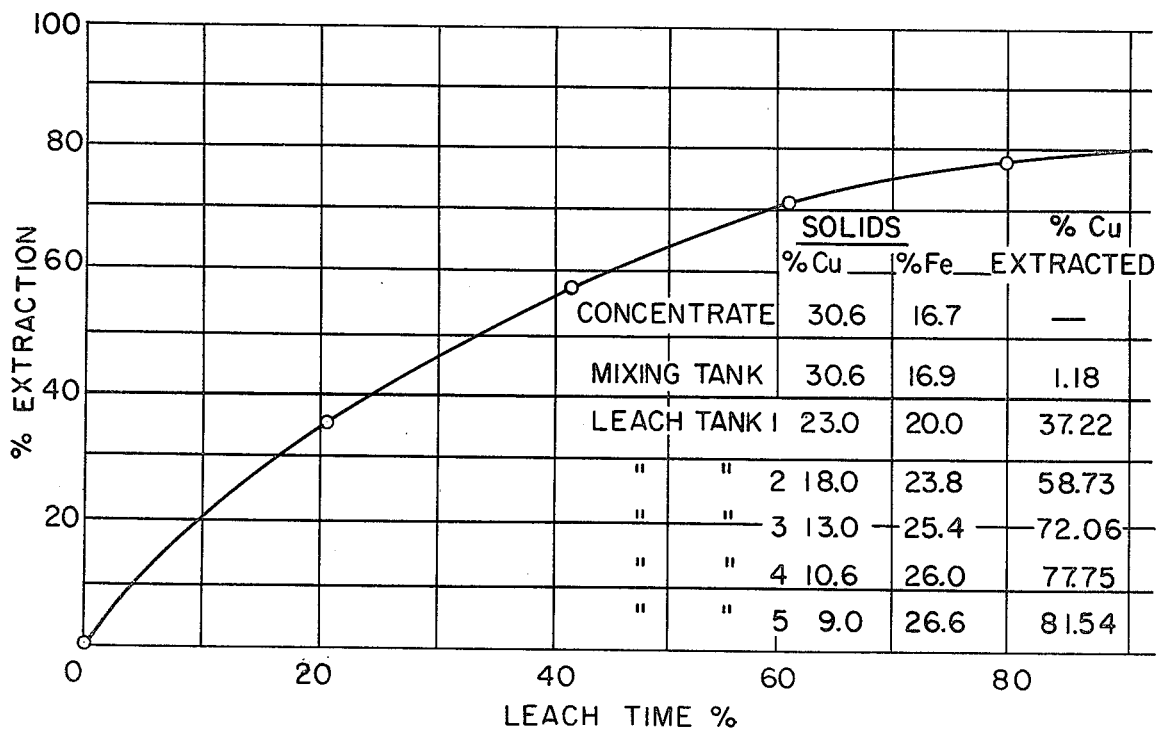
Figure 9:
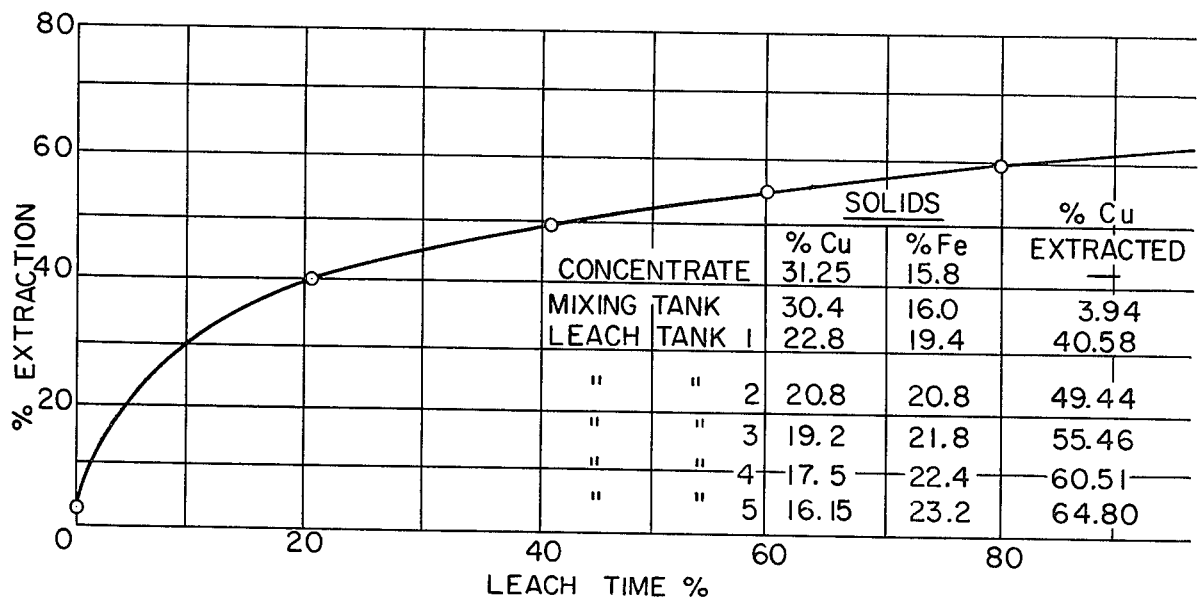
Figure 10:
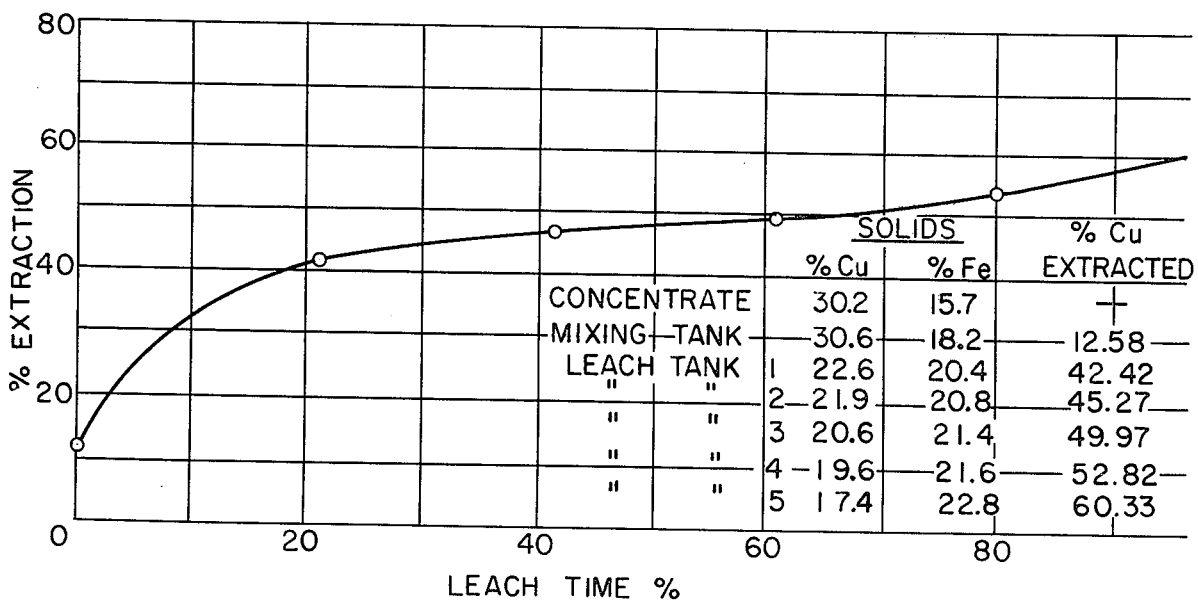

In the embodiment of the invention shown on the flowsheet of FIG. 2, finely divided nickel concentrates containing copper, preferably ground to minus 325 mesh, are formed into a slurry with an aqueous ammonia-ammonium sulfate solution in a closed slurry preparation vessel 10'. The slurry then flows by gravity or is pumped to the first of a series of primary leaching vessels 11', 12', 13' and 14'. The slurry is maintained to a depth indicated by the surface level L' in each of the leaching vessels and flows by gravity sequentially through the series. Each of the closed vessels 11' to 14' may be provided with internal coils or a jacket (not shown) for circulating heating or cooling medium in heat-exchange relation with the slurry therein. Each vessel is provided with an agitator impeller 16' driven by a motor M' for vigorously agitating the slurry. The motors M' each are sufficiently powerful so that in normal operation they drive each impeller 16' at a speed great enough to require the continuous input to each impeller shaft of at least 0.05 horsepower per cubic foot of slurry being agitated by the impeller.

Each vessel also is equipped with a gas recirculating pump or blower 17' for continuously and vigorously recirculating gas from above the surface level L' of the slurry to a point deep below such surface level. In place of the external recirculation pumps 17', each impeller 16' may be of the subaeration type, so as to effect internal recirculation of the gas from above the surface level L' to below such surface level.

All this equipment, including seals for the impeller shafts, is constructed for operation at substantially atmospheric pressure. No special high-pressure autoclave construction or design is needed. It is sufficient that the slurry containing equipment be enclosed to confine the ammonia, oxygen and water vapor.

Oxygen is supplied to each of the leaching vessels 11' to 14' from a supply tank 18'. The oxygen is delivered at a low superatmospheric pressure such as 5 psig. through a pressure regulating valve P', and it maintains such pressure in each leaching vessel. Gaseous ammonia is supplied to each of the first two vessels 11' and 12' from a supply tank 19' through flowmeters F' and valves V' by which the rate of admission of the ammonia to each of these two vessels may be independently controlled.

Slurry is discharged from the last leaching vessel 14, in the series into a storage or holding tank 20' equipped with an agitation impeller 21' driven by a motor M'. From the tank 20' the slurry flows into a first thickener 22', from which the liquid phase containing dissolved nickel and copper overflows and from which the solids are collected in the form of a thickened mud underflow. The overflow solution is treated for nickel and copper recovery and to regenerate aqueous ammonia-ammonium sulfate solution which is recycled to the slurry make-up tank 10' for preparing additional slurry for leaching. A bleed side stream is taken from the regenerated solution to separate excess sulfate dissolved from the nickel sulfide concentrates, and the ammonia recovered thereby is returned to the stream recycling to the slurry make-up tank (or it may be passed to ammonia storage).

The underflow from the thickener 22' flows sequentially through additional thickeners 23' and 24' making up a series of countercurrent decantation thickeners, where it is subjected to countercurrent washing with water. The advanced wash water joins with the nickel-bearing leach solution decanted as overflow from the first thickener 22'. The final washed underflow product from the last thickener 24' in the washing series may if desired be filtered, in which case the filtrate may be added to the advanced washings. The washed (and optionally filtered) solids residue is substantially depleted in nickel and copper and is sent to treatment for recovery of such values as it may contain (e.g. silver and gold), or is discarded.

EXAMPLE 3

Following is an example of the process of the invention as carried out in the apparatus and with the sequence of steps described above with reference to FIG. 2.

Nickel concentrates containing 7.5% by weight nickel and 2.5% by weight copper, largely in the form of pentlandite and chalcopyrite respectively, are slurried in the tank 10' with an aqueous solution of ammonium sulfate and ammonium hydroxide containing 90 grams per liter of ammonia (both free and combined) and substantially no dissolved nickel or copper. This slurry is mixed in the proportions of about 1250 gallons of solution to 5200 pounds (dry weight) of nickel concentrates forming a slurry containing about 35% solids by weight. This slurry is pumped continuously into the first of the leaching tanks 11' and it flows from tank to tank through the series by gravity.

Commercially pure oxygen is fed into the first (and each subsequent) tank at 6 psig. through the pressure regulating valve P', and thereby the pressure in the series of leaching tanks is established at that value. Gaseous ammonia is metered into each of the first two tanks 11' and 12' through the appropriate flow meters and valves at a rate sufficient to maintain the pH of the slurry in these tanks at about 10.

The slurry in each of the first two tanks (and in each other tank as well) is vigorously agitated by the impellers 16'. Each tank contains about 45 gallons (about 6 cubic feet) of slurry, and the impeller of each tank absorbs about 0.6 horsepower, corresponding to agitation with a vigor of substantially 0.1 horsepower per cubic foot of slurry.

The oxygen-bearing gas overlying the slurry level L' in each of the four leaching tanks is vigorously circulated by the pump 22; into the slurry at a point near the bottom of the tank.

In the first tank 11', where the rate of nickel and copper dissolution is maximum and where about 45% of the total nickel and copper content of the concentrates dissolves, the temperature of the slurry is maintained at about 65° C. This requires cooling of the slurry by circulation of cooling water through cooling coils disposed in the tank, because of the large amount of heat released by the exothermic dissolution reactions. In the second tank 12' the temperature of the slurry is raised to about 70° C., and here also it is necessary to cool the slurry to maintain it at this temperature. In this tank approximately another 20% of the total nickel and copper content of the concentrates dissolves, with a corresponding substantial heat release which is more than enough to raise the slurry temperature to the desired value and hold it there.

No gaseous ammonia is added to the slurry in the third or fourth tanks 13' and 14', and consequently the pH of the aqueous phase diminishes as the slurry passes through these tanks and additional nickel and copper is dissolved. In the third tank 13' the pH of the solution falls to about 9.8 while the temperature is raised to 75° C. The reduction in pH here is important in view of the rise in temperature, in order to maintain the sum of the partial pressures of ammonia and water vapor well below the 6 psig. established by the oxygen supply system and to maintain ample oxygen in the tank for efficient progress of the leaching reactions. Approximately 15% of the copper content of the concentrate is dissolved in this tank.

In the fourth tank 14' the pH of the aqueous phase of the slurry is about 9.5 and the temperature is held close to 80° C. The rate of nickel and copper dissolution in this tank is slow, and the slurry may be heated by circulation of heating fluid through coils in the tanks to establish and maintain the desired slurry temperature.

The retention time of the slurry in each tank is about two hours, so that the duration of the leach is in total about eight hours.

The aqueous phase of the slurry discharged from the first tank contains about 17 g/l nickel, about 6 g/l copper, and about 220 g/l sulfate, that from the second tank contains about 24 g/l nickel, about 8 g/l copper, and about 260 g/l sulfate, that from the third contains about 32 g/l nickel, about 10 g/l copper, and about 285 g/l sulfate, and that from the fourth tank contains about 36 g/l nickel, about 11 g/l copper, and about 300 g/l sulfate. The final slurry discharged into the tank 21 also has in its aqueous phase about 150 g/l total ammonia (of which about 15 g/l is free ammonia). The solid phase of this slurry amounts to about 1650 pounds out of each ton of dry concentrates charged into the system. It contains all the pyrites and gangue (silica, alumina, etc.) constituents of the concentrates, substantial iron oxide produced by oxidation of pyrrhotite and to a lesser extent of chalcopyrite, all the undissolved metal values such as gold and silver, and 10% of the original copper and about 5% of the original nickel content.

The slurry collected in the tank 20' is decanted and washed in the series of countercurrent washing thickeners 22', 23' and 24'. The aqueous phase overflowing the first thickener 22' is treated to recover copper and nickel and to regenerate ammonium sulfate leach solution. The solids content of the slurry is washed substantially free of dissolved nickel and copper and is collected as a thickened mud or filter cake containing about 85% of the total weight of concentrates fed into the system and assaying about 0.4% nickel and about 0.3% copper.

EXAMPLE 4

A group of tests were carried out in a series of time leaching tanks (A, B, and C) arranged substantially as the tanks 12', 13', and 14' of FIG. 2 to determine the effect of varying the agitation of a pulp of copper concentrates in an ammoniacal leach liquor into which oxygen is delivered, on the rate of copper dissolution from the pulp. The tests were carried out so as to show also the effect of varying the rate of delivery of oxygen-bearing gas into the pulp at each different degree of pulp agitation.

Dry copper sulfide concentrates were fed continuously into a mixing vessel equipped with a mechanical agitator and were there pulped with an aqueous solution containing ammonium sulfate and some free ammonia. The pulp was kept well-slurried by being continuously circulated by a pump. A stream of the pulp was passed substantially continuously into a first closed leaching tank which was maintained about half full of the pulp. From the first closed leaching tank (Tank A) the pulp overflowed by gravity into a second closed tank (Tank B), and thence it flowed by gravity into a third closed tank (Tank C). Pulp was substantially continuously discharged from the third tank through a valve which was opened and closed by a level indicator control so as to maintain a substantially constant pulp level in the third tank.

Pulp in each tank was agitated by an electrically driven mechanical agitator, the speed of which could be varied. Oxygen-bearing gas was continuously circulated by a pump from above the pulp in each tank to below the surface of the pulp in the same tank. The rate of circulation of the gas in each tank could be changed by varying the setting of an oxygen control valve, and could be measured by a flowmeter. Oxygen and ammonia gases were admitted from sources through control valves and to the circulating gas in each tank downstream from the flowmeter, and were delivered with the circulating gas into the agitated zone of the pulp, in the eye of the impeller. Ammonia was admitted at a rate determined by analysis of the vapor above the pulp in each tank, and oxygen was admitted at a rate to maintain the total pressure in each tank at 6 psig.

Three series of three tests each (nine tests in all) were conducted under the following basic conditions:

| Test No. | First Series | | | Second Series | | | Third Series | | | Av. |
|---|---|---|---|---|---|---|---|---|---|---|
| | 1 | 2 | 3 | 4 | 5 | 6 | 7 | 8 | 9 | |
| Conc. Feed, % Cu | 27.2 | 27.9 | 27.8 | 26.4 | 28.2 | 27.3 | 26.7 | 27.0 | 28.0 | 27.4 |
| Feed Rate, Dry lbs/hr. | 81 | 81 | 81 | 81 | 81 | 81 | 81 | 81 | 81 | 81 |
| Feed pulp, % solids | 17.5 | 17.5 | 17.5 | 17.5 | 17.5 | 17.5 | 17.5 | 17.5 | 17.5 | 17.5 |
| Leach tank temp., °C. | 75 | 75 | 75 | 75 | 75 | 75 | 75 | 75 | 75 | 75 |
| Vapor analysis (Orsa.) | | | | | | | | | | |
| Tank A, % NH$_3$ | 10 | 12 | 14 | 9 | 7 | 8 | 9 | 10 | 10 | 10 |
| Tank A, % O$_2$ | 86 | 84 | 83 | 84 | 92 | 89 | 84 | 84 | 83.5 | 85.5 |
| Tank B, % NH$_3$ | 6 | 7.5 | 7 | 7 | 7 | 7 | 9 | 8 | 9.5 | 7.5 |
| Tank B, % O$_2$ | 92 | 91.5 | 82.7 | 92 | 91 | 91 | 89 | 90.5 | 89 | 89.9 |
| Tank C, % NH$_3$ | 4 | 5.8 | 5 | 5 | 5 | 6 | 8 | 8 | 9.5 | 6.6 |
| Tank C, % O$_2$ | 95 | 93.2 | 91 | 93.5 | 93 | 93 | 90.5 | 91 | 88.5 | 92.1 |
| Total leach time, hrs. | 3.5 | 3.0 | 2.0 | 3.0 | 3.0 | 3.5 | 3.25 | 4.25 | 3.5 | 3.2 |
| Copper Extraction in Mixing Tank 1: % Extraction | 6.4 | 9.5 | 6.7 | 11.7 | 7.1 | 6.5 | 8.3 | 10.2 | 8.9 | 8.4 |
| lb/hr. Extracted | 1.42 | 2.15 | 1.50 | 2.49 | 1.61 | 1.44 | 1.79 | 2.24 | 2.02 | 1.85 |

In the first test series (Tests 1, 2, and 3) the agitator impeller speed in each tank was held at 210 rpm., while the rate of gas recirculation was varied from 10.0 cubic feet per minute in Test 1, to 4 cubic feet per minute in Test 2, to 1.6 cubic feet per minute in Test 3. In the second test series (Tests 4, 5, and 6), the agitator impeller speed was decreased to 150 rpm, and the gas recirculation rate was varied as in the Tests 1, 2, and 3, respectively. In the third test series (Tests 7, 8 and 9) the agitator impeller speed was increased to 290 rpm. and the gas recirculation rate again was varied as in Tests 1, 2, and 3, respectively.

An impeller speed of 210 rpm. at a gas recirculation rate of 10 cu. ft./min. corresponded to a net input of 0.05 horsepower of mechanical agitation per cubic foot of pulp in each tank. Net horsepower input was determined by measuring of the gross horsepower output of the agitator motor (from agitator motor power meter readings), deducting the friction or tare horsepower required to drive the reduction gearing the impeller at the same speed with the tank empty, and dividing the resulting net horsepower input by the number of cubic feet of pulp in the tank. Impeller speeds of 150 rpm. and 290 rpm. also at a gas recirculation rate of 10 cu. ft./min. corresponded respectively to net inputs of 0.02 and 0.11 horsepower of mechanical agitation per cubic foot of pulp. At lower gas recirculation rates the density of the pulp was greater and hence net horsepower input at the stated impeller speeds was greater. The net horsepower input to the impeller at the various speeds and at the various rates of gas recirculation was as follows:

| Impeller Speed | Gas Recirculation Rate | | |
|---|---|---|---|
| | 10 cu. ft./min. | 4 cu. ft./min. | 1.6 cu. ft./min. |
| 150 rpm. | 0.02 h.p./cu.ft. | 0.02 h.p./cu.ft. | 0.04 h.p./cu.ft. |
| 210 rpm. | 0.05 h.p./cu.ft. | 0.05 h.p./cu.ft. | 0.07 h.p./cu.ft. |
| 290 rpm. | 0.11 h.p./cu.ft. | 0.11 h.p./cu.ft. | 0.15 h.p./cu.ft. |

In all the tests the pulp being leached contained 17.5% by weight of solids (copper concentrates); and in all of the tests the solids component of the pulp was completely and substantially uniformly suspended in the aqueous phase of the pulp. The variation in agitation horsepower input into the pulp, over the range had no significant effect on the efficacy of suspension of the solids in the liquid phase of the pulp.

The test results were as follows:

| | Leach Tank A | | | Leach Tank B | | | Leach Tank C | | |
|---|---|---|---|---|---|---|---|---|---|
| First Test Series | | | | | | | | | |
| Test Number | 1 | 2 | 3 | 1 | 2 | 3 | 1 | 2 | 3 |
| Impeller Speed, rpm. | 210 | 210 | 210 | 210 | 210 | 210 | 210 | 210 | 210 |
| Gas recirculation rate, cu.ft./min. | 10 | 4 | 1.6 | 10 | 4 | 1.6 | 10 | 4 | 1.6 |
| Copper extraction % | 38.7 | 36.8 | 38.9 | 54.7 | 52.4 | 44.0 | 63.6 | 58.7 | 56.8 |
| Copper extracted, lb./hr. | 7.11 | 6.89 | 7.03 | 3.52 | 3.30 | 1.39 | 1.96 | 1.67 | 2.87 |
| Second Test Series | | | | | | | | | |
| Test Number | 4 | 5 | 6 | 4 | 5 | 6 | 4 | 5 | 6 |
| Impeller Speed, rpm. | 150 | 150 | 150 | 150 | 150 | 150 | 150 | 150 | 150 |
| Gas recirculation rate, cu.ft./min. | 10 | 4 | 1.6 | 10 | 4 | 1.6 | 10 | 4 | 1.6 |
| Copper extraction % | 30.3 | 29.1 | 26.3 | 39.9 | 38.2 | 33.7 | 47.9 | 43.9 | 38.9 |
| Copper extracted, lb./hr. | 3.98 | 5.03 | 4.37 | 2.06 | 2.06 | 1.64 | 1.72 | 1.32 | 1.15 |
| Third Test Series | | | | | | | | | |
| Test Number | 7 | 8 | 9 | 7 | 8 | 9 | 7 | 8 | 9 |
| Impeller speed rpm. | 290 | 290 | 290 | 290 | 290 | 290 | 290 | 290 | 290 |
| Gas recirculation rate, cu.ft./min. | 10 | 4 | 1.6 | 10 | 4 | 1.6 | 10 | 4 | 1.6 |
| Copper extraction, % | 47.4 | 48.0 | 43.0 | 69.9 | 70.8 | 59.8 | 77.5 | 76.9 | 70.7 |
| Copper extracted, lb./hr. | 8.45 | 8.25 | 7.73 | 4.84 | 5.00 | 3.81 | 1.66 | 1.42 | 2.47 |

The foregoing test results show that there is improvement in both overall copper extraction and in rate of copper extraction with increase in the rate of gas recirculation. With a few exceptions, both the cumulative total copper extraction and the rate of copper extraction increased in each leach tank during each test series as the rate of gas recirculation increased from 1.6 to 10 cubic feet per minute.

The most significant increase in both total copper extraction and in rate of copper extraction occurred with increase in impeller speed (net horsepower input into the pulp). This increase is summarized in the following tabulation from the foregoing test results for each leach tank, at a gas recirculation rate of 10 cubic feet per minute:

| Leach Tank A | | | |
|---|---|---|---|
| Impeller Speed | 150 | 210 | 290 |
| Corresponding net h.p./cu. ft. | 0.02 | 0.05 | 0.11 |
| Cumulative copper extractions, % | 30.3 | 38.7 | 47.4 |
| Rate of copper extraction, lb./hr. | 3.98 | 7.11 | 8.45 |
| Leach Tank B | | | |

| -continued | | | |
|---|---|---|---|
| Impeller Speed | 150 | 210 | 290 |
| Corresponding net h.p. | 0.02 | 0.05 | 0.11 |
| Cumulative copper extraction, % | 39.9 | 54.7 | 69.9 |
| Rate of copper extraction, lb./hr. | 2.06 | 3.52 | 4.84 |
| Leach Tank C | | | |
| Impeller Speed | 150 | 210 | 290 |
| Corresponding net h.p. | 0.02 | 0.05 | 0.11 |
| Cumulative copper extraction, % | 47.9 | 63.6 | 77.5 |
| Rate of copper extraction, lb./hr. | 1.72 | 1.96 | 1.66 |

The foregoing summary shows that the rate of copper extraction in leach Tank A (the first in the series where leaching proceeds most readily) was over twice as great at high (290 rpm.) agitation as at low (150 rpm.) agitation—8.45 lb./hr. vs. 3.98 lb./hr. The difference in extraction rates at high and low agitation was less in Tanks B and C due to the fact that the feed to these tanks contained less undissolved copper in the test at high agitation than in the tests at lower agitation. The foregoing summary also shows that the total cumultative copper extraction was over 60% greater at high agitation (290 rpm.) than at low agitation (150 rpm.)—77.5% vs. 49.9%.

The total copper extraction at the high agitation rate was only 77.5% because of the short duration of the leach (about three hours). Experience has shown that cumulative extractions approximating 95% can be obtained from similar copper sulfide concentrates at corresponding high agitation (0.11 h.p. input to the impeller per cubic foot) if the leach during is extended to six hours. Experience has also shown at corresponding low agitation (0.02 h.p. input to the impeller per cubic foot) it is impossible to obtain a cumulative extraction as high as 95% from similar copper sulfide concentrates without extending the duration of the leach to extremely long times (generally longer than 24 hours).

Although the foregoing tests were conducted at a gas recirculation rate of 10 cubic feet per minute, similar showings can be made at other gas recirculation rates.

Although the tests described in this Example involve the leaching of copper sulfide flotation concentrates containing little or no nickel, corresponding tests and results can be realized by leaching nickel and copper-nickel concentrates with ammoniacal leach liquor.

EXAMPLE 5

A series of tests were carried out to determine the effectiveness of leaching a pulp of copper sulfide concentrates with an ammoniacal leach solution in a series of leaching vessels arranged substantially as the leaching vessels 11, 12, 13, 14 and 15 of FIG. 1 but having only a single pump corresponding to the pumps 17 for continuous circulation of oxygen and ammonia through the pulp in each vessel. For comparison, the gas circulation pump was disconnected and pulp was leached without continuous circulation of oxygen and ammonia through the pulp.

PART I

Copper sulfide concentrates and an aqueous raffinate solution containing from 70 to 85 grams per liter total ammonia (present as ammonium sulfate and aqueous ammonia) were continuously introduced into a mixing tank and formed into a pulp by being agitated and by being continuously recirculated in such tank by a pump. Pulp containing about 18% by weight of solids was continuously fed at a rate of about one ton of dry solids per day from the mixing tank by the recirculation pump into the first of a series of five (5) closed leaching tanks, through which the pulp flowed serially by gravity. The residence time of the pulp in the series of tanks was about five and a half hours. The pulp of leach solution and leached concentrate residue was withdrawn from the last tank through a discharge valve controlled by a level indicator control at a rate to maintain a substantially constant pulp level in the last tank.

Each tank was approximately half-filled with pulp, and the pulp in each tank was continuously and strongly agitated by a motor driven agitator. An atmosphere of water vapor, oxygen and ammonia filled each tank above the pulp level, and this atmosphere was continuously recirculated by a pump drawing from a top header connected to each tank above the pulp level and discharging through a bottom header into riser connections to each tank at the bottom. Thus, oxygen and ammonia was continuously circulated up through the pulp in each tank. Free ammonia was delivered directly into each of the first four tanks through the riser connection. Free oxygen was delivered into the gas stream entering the last tank at a rate sufficient to maintain the total gas pressure in the system at about 6 psig. A continuous bleed of gases was taken from the first tank, at a sufficient rate to prevent build-up to more than 10% of the total gas volume of nitrogen and other inert gases gaining admission to the system. The temperature of the pulp in each tank was held at close to 75° C.

PART II

For comparison purposes, the foregoing procedure of Part I of this Example was repeated except only that the provision for continuous circulation of gas through the pulp in each leaching tank was omitted. To this end the gas recirculation pump and the bottom header was disconnected from the apparatus, and ammonia and oxygen were admitted to the system only by sparging these gases into the bottom of the first tank. However, both oxygen and ammonia had free access to each successive leaching tank through the pressure-equalizing top header which was not disconnected, and could interact with the pulp in each tank at the interface of the agitated pulp and the overlying gas.

In carrying out tests in Part II the total ammonia content of the aqueous raffinate solution delivered to the mixing tank (70–85 grams per liter), the pulp density (18% solids), the rate of concentrate feed (one ton of dry solids per day), the rate of ammonia admission (to maintain approximately 10% ammonia in at least the first tank), the rate of oxygen admission (to maintain 6 psi. total pressure), the amount of gas bleed from the first tank to control inert gas build-up (to less than 10% of the total gas volume) and the pulp temperature in each tank (75° C.) were all substantially the same as when carrying out tests with the procedure of Part I. Each test was continued until substantially equilibrium conditions were established.

The first pair of tests (Tests I and II) was made using as the feed a copper concentrate that had become quite severely oxidized as a result of outdoor exposure for nearly a year. This concentrate assayed 21.8% copper, of which 12%, or over half, was acid soluble. A second pair of tests (Tests III and IV) was made using as the feed a fresh substantially unoxidized (very low acid-soluble) copper concentrate which assayed approximately 29 to 31% copper, about 16% iron and about 7% zinc.

Two leach profiles were taken in the course of each test. Each leach profile represents the conditions prevailing at a given time throughout the leaching system. To take a leach profile, samples of leach solution, pulp solids, and vapor phase were taken substantially concurrently from each of the leaching tanks at a time when the system was in substantial equilibrium, and these samples were analyzed to determine the various leach parameters. From the analyses a graph was prepared showing the percentage of copper extracted vs. leach time.

The leach profiles, each comprising a plot of percent copper extracted vs. leach time, are attached as FIGS. 3-10. Shown on each such plot is a tabulation of the copper and iron analyses of the concentrate and of the solids (leach residue) in each tank (including the mixing tank); and the cumulative percentage of copper extracted in each tank, as determined from the samples on which the plot is based. To the extent that profile 1 and profile 2 of each test differ from one another, they show normal process variations that occur from time to time during conduct of the leaching operation.

It is immediately apparent from an inspection of the leach profiles of Tests I and III that the highly oxidized concentrates used were very readily soluble in the ammoniacal raffinate solution (substantially 20% of the copper dissolved in the mixing tank before the slurry was even introduced into the leaching tanks). It is, therefore, not surprising that very high copper extractions were obtained both when leaching with the Part I arrangement (Test I) and also when leaching with the Part II arrangement (Test II). But even with these very easily soluble concentrates, there was a clearly smaller total extraction of copper when using the Part II arrangement (90-93%) than when using the Part I arrangement (95%). This difference is even more apparent from a comparison between tests of the amount of copper remaining in the final leach residue from the last tank: The final leach residue from Test II contained from 50% to 100% more copper than the final residue from Test I. These tests establish that even with oxidized concentrates which are readily soluble in ammoniacal solutions, continuous recirculation of the gas phase from above the agitated pulp in each tank to below the surface of the pulp contributes significantly to increasing the rate of copper extraction.

The leach profiles of Tests III and IV show that unoxidized concentrates as used in these tests are not readily leached by simple agitation in an open mixing vessel. In these tests generally only 1% to 4% of the copper was extracted in the mixing vessel (the high extraction of 12% in the mixing vessel shown in Test 4, profile 2, is anomalous). A comparison of the leach profiles of Tests III and IV shows that approximately 81% of the copper of the concentrates was extracted when the vapor phase was continuously recirculated (Test III), whereas the copper extraction was only 60% and 65% when the vapor phase was not recirculated (Test IV). Almost twice as much copper remained undissolved in the residue from the last tank in Test IV (16 to 17%) as in the residue from the last tank in Test III (9%). From these tests it is apparent that when leaching substantially unoxidized concentrates a very significant increase in the rate of copper extraction is obtained by continuously recirculating the oxygen-bearing gas phase from above the pulp to below the surface of the agitated pulp in each vessel.

Although the above tests were performed on copper sulfide flotation concentrates containing little or no nickel, corresponding results are obtained when leaching nickel and copper-nickel concentrates with ammoniacal leach liquor.

What is claimed is:

1. The method of recovering a metal of the group consisting of copper, nickel and zinc from finely divided sulfidic minerals thereof which comprises forming, in an aqueous solution containing ammonium sulfate and free ammonia, a slurry of said minerals ground substantially to the fineness of flotation concentrates, passing said slurry into a closed leaching vessel, introducing oxygen into said vessel in an amount sufficient to maintain therein an oxygen partial pressure of at least several psi., maintaining the pressure in said vessel near atmospheric pressure and maintaining the temperature of the slurry in said vessel in the range from 50° C. to the boiling temperature, mechanically agitating the body of slurry in said vessel with a vigor input of at least 0.05 horsepower per cubic foot while continuously recirculating oxygen-bearing gas from above the body of agitated slurry into said body at a substantial depth below the surface of said body, withdrawing from said vessel slurry containing said metal complexed with ammonia dissolved in the aqueous phase and mineral matter depleted in said metal in the solid phase, separating said solid phase containing residual and undissolved copper, nickel or zinc from the leach solution and mixing the solid phase with aqueous ammonium sulfate solution containing free ammonia and subjecting the resulting slurry to a secondary leaching operation in a closed releaching vessel at a lower pH and at a higher temperature than during the primary leaching operation while mechanically agitating the slurry in said releaching vessel with a vigor input of at least 0.05 horsepower per cubic foot and while introducing oxygen into the agitated slurry at a substantial depth below its surface, and thereafter separating the aqueous phase from the solid phase.

2. The method according to claim 1 wherein the secondary leaching operation is conducted by passing the slurry sequentially through a series of vessels in the first of which the pH of the slurry is higher and its temperature is lower than in the second vessel of the series.

3. The method according to claim 1 wherein the temperature of the slurry during the secondary leach is at least about 75° C.

* * * * *